April 16, 1935.  P. S. RUSSEL ET AL  1,997,917
GAUGE
Filed April 9, 1930
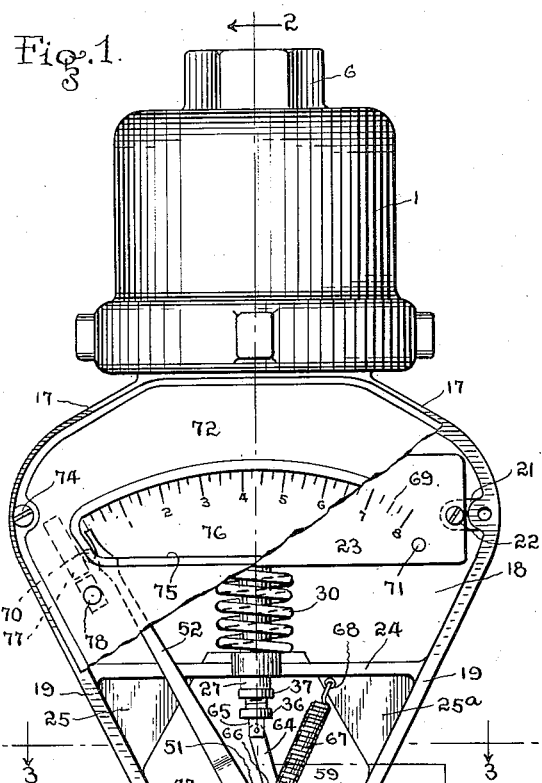
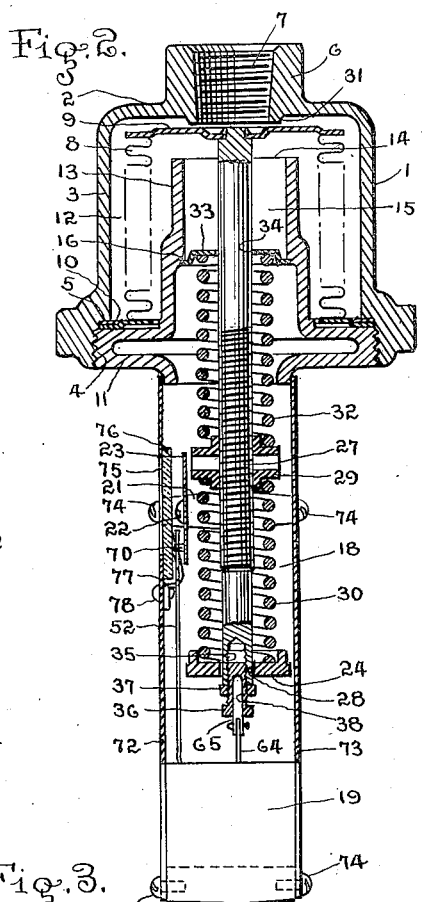
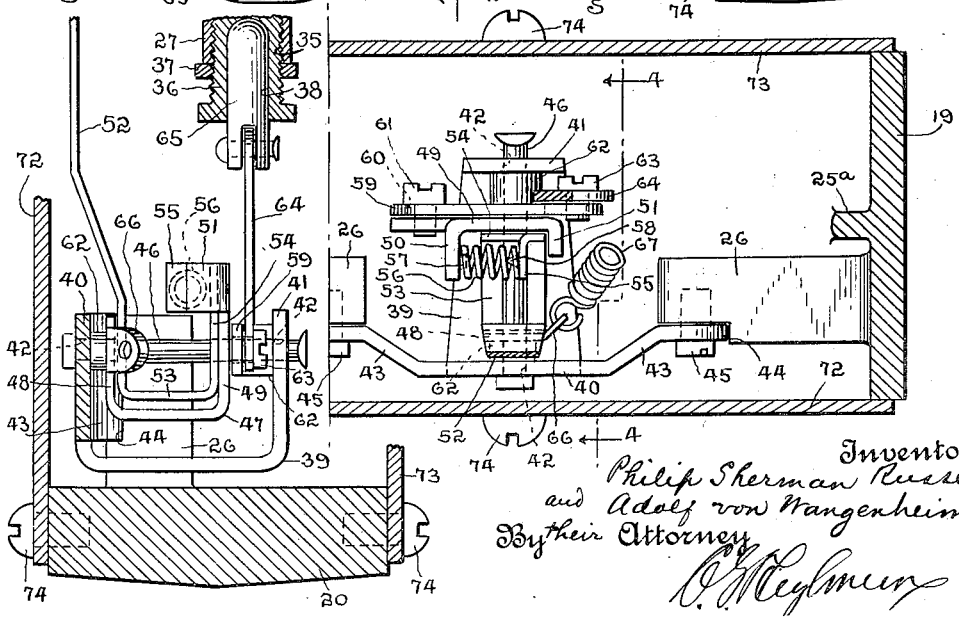
Inventors
Philip Sherman Russel
and Adolf von Wangenheim
By their Attorney Patented Apr. 16, 1935

1,997,917

UNITED STATES PATENT OFFICE 1,997,917

GAUGE

Philip Sherman Russel and Adolf von Wangenheim, Detroit, Mich., assignors to Detroit Lubricator Company, Detroit, Mich., a corporation of Michigan Application April 9, 1930, Serial No. 442,781

16 Claims. (Cl. 73—110)

Our invention relates to new and useful improvements in gauges, and more particularly to a gauge for indicating liquid level in a tank or the like.

An object of our invention is to provide a gauge which when positioned in the delivery line from a tank will accurately indicate the level of liquid in the tank, whether the gauge is positioned above or below the tank level.

Another object is to provide a gauge which is regulatable for use with liquids of different specific gravities.

Another object is to provide means to permit overtravel of the pressure responsive means beyond the limit of travel of the indicator pointer, thereby preventing injury to the mechanism.

The invention consists in the improved construction and combination of parts, to be more fully described hereinafter, and the novelty of which will be particularly pointed out and distinctly claimed.

In the accompanying drawing, to be taken as a part of this specification, we have fully and clearly illustrated a preferred embodiment of our invention, in which drawing—

Figure 1 is a view in front elevation, with the casing partly broken away, of a gauge embodying our invention;

Fig. 2 is a view in section on the line 2—2 of Fig. 1;

Fig. 3 is an enlarged detail view in section on the line 3—3 of Fig. 1, but with the pointer in vertical position, and Fig. 4 is a detail view in section on the line 4—4 of Fig. 3.

Referring to the drawing by characters of reference, 1 designates a casing or housing member of substantially inverted cup-shaped formation, having an end or top wall 2 from which depends a substantially cylindrical side wall 3, having at its lower end an internal marginal recess 4 to provide a downward facing annular shoulder 5. On the end wall 2 is an external boss 6 through which and the wall 2 is an internally threaded inlet aperture 7. The open bottom or underside of the casing 1 is sealed by a resilient expansible-contractible wall or member 8, preferably a substantially cylindrical, circumferentially corrugated, metal bellows positioned substantially concentrically within the casing 1 and having a head 9 closing and sealing its upper end adjacent wall 2, and at its lower end having a lateral circumferential flange 10 which seats against the shoulder 5. Threaded or otherwise secured in the recess 4 is a disk or plate member 11 which tightly clamps the flange 10 against shoulder 5 to provide an hermetically sealed chamber 12 between the bellows 8 and the walls of casing 1. Rising from the top or inside face of member 11 is a boss or the like 13, substantially concentric with and within bellows 8. The boss 13 terminates, as at 14, adjacent the head 9 to limit or stop collapse or contraction of the bellows short of its elastic limit. Through the member 11 and boss 13 is a bore 15 having an internal continuous downward facing shoulder 16 for a purpose to be described.

Extending laterally from substantially diametrically opposite points on the underface of member 11, are downward inclined top wall members 17 of a mechanism housing or casing 18. The members 17 merge into downward converging side wall members 19 which join with a bottom wall member 20. Substantially at the junction of the members 17 and 19 are opposite inwardly projecting lugs 21 which are set back from the plane of the front face of the casing 18. Extending between the lugs 21 and secured thereto by screws or the like 22, is an indicia-carrying plate 23. The members 19 are joined by a substantially horizontal cross-bar or member 24 having its forward edge set back from the plane of the front face of casing 18. Reinforcing webs or gussets 25, 25a are preferably provided between the member 24 and members 19. At the lower ends of members 19 are opposite inwardly projecting bosses 26 which are also set back from the plane of the front face of casing 18. The members 17, 19, 20 and 24 comprise a supporting frame for the gauge mechanism.

Depending from and fixed centrally to the bellows head 9 is a stem or plunger 27 which extends through bore 15, and a guide aperture 28 in cross-member 24. Threaded on the stem 27 above member 24 for longitudinal adjustment, is a nut 29. Positioned between the nut 29 and member 24 is a resilient member 30, preferably a coil spring under compression and acting to expand the bellows 8 toward an annular stop member 31 carried by the casing wall 2. Acting on the top face of nut 29 in opposition to spring 30, is a resilient member 32, preferably a coil spring, tending to collapse the bellows 8, and held under compression by a disc or abutment member 33 which engages the shoulder 16 and has a guide aperture 34 for plunger 27. In the bottom end of plunger 27 is an internally threaded socket 35 having a screw plug 36 adjustably threaded therein. The plug 36 is preferably provided with a lock nut 37 and has an axial downward open bore or socket 38 for a purpose to be described.

Positioned between the bosses 26 is a rigid, substantially U-shaped supporting member 39 having front and rear substantially vertical upright members 40, 41 through which are alined apertures 42. Extending laterally from member 40 are arm members 43 which seat at their free ends in recesses 44 in the front faces of bosses 26 to which they are secured by screws or the like 45. Extending through the apertures 42 is a shaft 46 on which is journaled a cradle or operating member 47 of substantially U-shaped form having front and rear upright members 48, 49. At the top of the rear member 49 are substantially parallel forwardly extending spaced ears or abutment members 50, 51. Also journaled on the shaft 46 but to the rear of member 49, is a needle or pointer 52, which extends upward in front of the member 24 into overlying cooperable relation to the scale plate 23. The end of pointer 52 which extends below shaft 46 has a rearward extension 53 from which rises an arm 54 through which shaft 46 passes. The extension 53 is of such length that pointer 52 will be held against movement longitudinally of shaft 46. The side edge of arm 54 is normally in lateral engagement with abutment or stop member 51. Extending forward from arm 54 between members 50 and 51, and in opposing substantially parallel relation to member 50, is an ear or abutment member 55. Positioned between members 50 and 55 is a resilient member 56, such as a coil spring held under compression and normally urging the arm 54 against ear or member 51. The members 50 and 55 are preferably provided with centering and supporting pins 57, 58 for spring 56. Fixed to the rear face of the member 49 is an adjustable plate or lever member 59 which projects laterally beyond ear 51 and has a longitudinal slot 60 through which the shaft 46 and a locking screw 61 pass, the screw 61 being threaded into the member 49. The cradle 47 is preferably held against movement longitudinally of the shaft 46 by sleeve or washer members 62. Pivoted on a pin or screw 63 fixed to the projecting end of member 59, is a link or connecting member 64 which extends upwardly and has pivoted on its upper end a rod or plunger 65 having a free sliding fit in the bore 38. On the front cradle member 48 is a laterally extending ear or lug 66 to which is secured one end of a resilient member 67, preferably a light coil spring under tension and having its other end fixed to the web 25a, as at 68. The spring 67 serves to maintain rod 65 seated against the bottom of the bore 38 so that movement of stem 27 will be transmitted to pointer 52. On the plate 23 is a graduated scale 69, at the ends of which are stop pins or members 70, 71, which project from plate 23 into the path of travel of pointer 52. The front and back of the mechanism casing 18 are closed by plate or cover members 72, 73, which are secured to the frame members 17, 19 and 20 by screws or the like 74. The front cover member 72 has an opening 75 therethrough which registers with scale 69 and which is preferably sealed by a glass 76 held in position by spring clips 77 fixed by rivets 78, or the like, to the member 72.

The operation of our gauge is as follows: The gauge is connected at the inlet 7 by means of nipple 6 into the tank delivery conduit or pipe line. The gauge may be adjusted for changes in the specific gravity of the liquid by means of the slotted plate member 59 and the screw plug 36, which provide for regulating the movement of the pointer 52 relative to a given movement of plunger 27. An increase in the specific gravity of the liquid is compensated for by decreasing the lever arm through which the link 64 acts on the pointer, i. e., the distance between the center lines of the pin 63 and shaft 46, which is accomplished by loosening the screw 61 and shifting the plate 59 to the left of Figs. 1 and 3. A decrease in the specific gravity is compensated for by movement of plate 59 toward the right of Figs. 1 and 3. Any adjustment of the plate member 59 will necessitate adjustment of the distance from the end of plunger 27 to the pivot 63, which is accomplished by means of the screw plug 36. Any air which is in the line and chamber 12 is withdrawn by the liquid suction means if the tank is below the gauge, or is forced out by gravity flow of the liquid if the tank is above the gauge. The depth of liquid in the tank is measured and the pointer 52 is then set by means of the nut 29 to indicate on the scale 69 the measured depth of the liquid. If the gauge is above the tank, the chamber 12 will be under sub-atmospheric pressure, tending to expand the bellows against the resistance of spring 32. If the gauge is below the tank, the chamber 12 will be under pressure of the gravity head of the liquid in the tank, tending to compress the bellows against the resistance of spring 30. In either case the plunger 27 will be moved up as the liquid level drops, and will be moved down as the liquid level is increased in the tank. Downward movement of plunger 27 acts through plunger 65 held in engagement therewith, through link 64, to rotate the cradle 47 clockwise of Fig. 1, the spring 56 transmitting the cradle movement to the pointer 52. Should it happen that the pointer 52 be moved into engagement with the stop 71, or reach its limit of travel, the plunger 27 will have lost motion and can continue to move downward, by reason of the spring 56 permitting relative movement between the cradle and the pointer. Upon upward movement of plunger 27, the spring 67 will maintain rod 65 against plunger 27, turning cradle 47 counterclockwise of Fig. 1 with abutment 51 acting against arm 54 to move the pointer 52. When the pointer abuts stop pin 70, or for any other reason is halted in its travel, the plunger 27 will move upward freely on or relative to rod 65, thus permitting overtravel of the bellows and preventing injury to the gauge mechanism. The adjustments for variation in specific gravity provide means to maintain the angle of deflection constant through which the pointer moves in response to a given variation in liquid level in the tank.

It will be noted that our gauge is not affected by changes in atmospheric pressure as the bellows 8 and head 9 are open to atmospheric pressure on one side through the bore 15, and open on their other side through port 7 to atmospheric pressure existing over the liquid in the supply tank. Since our gauge will record pressures either above or below atmospheric, it is apparent that if it is positioned between the horizontal planes of the top and bottom of a liquid supply tank, that it will accurately indicate the varying supply tank level, which varying liquid level produces in part, i. e., initially, a pressure head, and in part, i. e., finally, a suction head.

What we claim and desire to secure by Letters Patent of the United States is:—

1. A device of the character described, comprising a casing having an inlet and an open side, an expansible-contractible member sealing said side, a plunger fixed to said member, means guiding said plunger for longitudinal reciprocation, means resisting movement of said member, supporting means, a pointer journaled on said supporting means for oscillatory movement, and a lost motion connection operatively connecting said plunger and said pointer whereby said plunger in moving said pointer may move beyond the permitted range of travel of said pointer.

2. A device of the character described, comprising a casing having an inlet and an open side, an expansible-contractible member sealing said side, a plunger fixed to sai d member, means guiding said plunger for longitudinal reciprocation, means resisting movement of said member, supporting means, a pointer journaled on said supporting means for oscillatory movement, and means operatively connecting said plunger and said pointer, said connection including a spring whereby to permit overtravel of said plunger when said pointer has reached its limit of movement.

3. A device of the character described, comprising a casing having an inlet and an open side, an expansible-contractible member sealing said side, a plunger fixed to said member, means guiding said plunger for longitudinal reciprocation, means resisting movement of said member, supporting means, a pointer journaled on said supporting means for oscillatory movement by said plunger, an operating member having operative connection with said plunger, said operating member having a one-way driving connection with said pointer to move said pointer in one direction, and resilient means for movement of said plunger in the opposite direction.

4. A device of the character described, comprising a casing having an inlet and an open side, an expansible-contractible member sealing said side, a plunger fixed to said member, means guiding said plunger for longitudinal reciprocation, means resisting expansion of said member, means resisting contraction of said member, supporting means, a pointer journaled on said supporting means for oscillatory movement, and means operatively connecting said plunger and said pointer and including means to regulate the movement of said pointer for a given movement of said plunger.

5. A device of the character described, comprising a casing having an inlet and an open side, an expansible-contractible member sealing said open side, a plunger fixed to said member, means guiding said plunger for longitudinal reciprocation, means resisting movement of said member, guide means on the free end of said plunger, a member guided by said last named means and reciprocable longitudinally of said plunger, means normally maintaining said member in engagement with said plunger, supporting means, a pointer journaled on said supporting means for oscillatory movement, and means connecting said guided member and said pointer.

6. A device of the character described, comprising a casing having an inlet and an open side, an expansible-contractible member sealing said open side, a plunger fixed to said member, means guiding said plunger for longitudinal reciprocation, means resisting movement of said member, the free end of said plunger having a substantially axial socket, a rod reciprocable in said socket and adapted to seat therein, supporting means, a pointer journaled on said supporting means for oscillatory movement, means connecting said rod and said pointer, and resilient means urging said rod into engagement with said plunger whereby movement of said plunger will be transmitted to said rod.

7. A device of the character described, comprising a casing having an inlet and an open side, a resilient expansible-contractible member sealing said side, a plunger fixed to said member, means guiding said plunger for longitudinal reciprocation, a rigidly supported shaft, a pointer journaled on said shaft, means journaled on said shaft and having operative engagement with said pointer, and means connecting said last-named means and said plunger.

8. A device of the character described, comprising a casing having an inlet and an open side, a resilient expansible-contractible member sealing said side, a plunger fixed to said member, means guiding said plunger for longitudinal reciprocation, a rigidly supported shaft, a pointer journaled on said shaft, an operating member journaled on said shaft, resilient means to transmit motion from said operating member to said pointer, and means connecting said operating member and said plunger.

9. A device of the character described, comprising a casing having an inlet and an open side, a resilient expansible-contractible member sealing said side, a plunger fixed to said member, means guiding said plunger for longitudinal reciprocation, a rigidly supported shaft, a pointer journaled on said shaft, means journaled on said shaft and having operative engagement with said pointer, and means connecting said last-named means and said plunger, said last-named means including means to regulate the movement of said pointer for a given movement of said plunger.

10. A device of the character described, comprising a casing having an open side, a resilient expansible-contractible member sealing said open side, said casing having an inlet, a plunger fixed to said member, a plurality of spring means positioned on the same side of and cooperable with said resilient member, one of said spring means resisting expansion of said member, another of said spring means resisting contraction of said member, means surrounding said plunger and operable to regulate the resistance of each of said resisting means, and a pointer operatively connected to said plunger.

11. A device of the character described, comprising a casing having an open side, a resilient expansible-contractible member sealing said open side, said casing having an inlet, a plunger fixed to said member, an adjustable abutment on said plungers, spring means held under compression against said abutment to resist expansion of said member, spring means held under compression against said abutment to resist compression of said member, and a pointer operatively connected to said plunger.

12. In a device of the character described, means responsive to fluid pressure, a plunger operatively connected to said means for movement thereby, means resisting movement of said plunger, a supporting shaft, an operating member journaled on said shaft, a pointer journaled on said shaft, means operatively connecting said member and said pointer, a lever arm adjustably secured to said operating member, and means operatively connecting said lever arm and said plunger whereby movement of said first-named means will be transmitted to said pointer.

means responsive to fluid pressure, a plunger operatively connected to said means for movement thereby, means resisting movement of said plunger, a supporting shaft, an operating member journaled on said shaft, a pointer journaled on said shaft, said pointer having an abutment member, said operating member having an abutment member disposed opposite said first-named abutment member, spring means interposed between said abutment members whereby movement of said operating member will move said pointer, and means operatively connecting said operating member and said plunger.

14. In a device of the character described, means responsive to fluid pressure, a plunger operatively connected to said means for movement thereby, means resisting movement of said plunger, a supporting shaft, an operating member journaled on said shaft, a pointer journaled on said shaft, said pointer having an abutment member, said operating member having an abutment member disposed opposite said first-named abutment member and having a stop member cooperable with said first-named abutment member to limit movement of said pointer relative to said operating member in one direction, spring means interposed between said abutment members and normally urging said first-named abutment member into engagement with said stop member whereby movement of said operating member will move said pointer, and means operatively connecting said operating member and said plunger.

15. In a device of the character described, means responsive to fluid pressure, a plunger operatively connected to said means for movement thereby, means resisting movement of said plunger, a supporting shaft, a substantially U-shaped operating member having the arms thereof apertured and receiving said shaft, one of the arms of said operating member having opposed and spaced abutment members, a pointer journaled on said shaft between said arms and having an arm positioned between said abutment members, spring means positioned between said arm and one of said abutment members and normally acting to urge said arm into engagement with the other of said abutment members, and means operatively connecting said operating member and said plunger, said last-named means including means to adjust the movement of said pointer for a given movement of said plunger.

16. A device of the character described, comprising a casing having an expansible-contractible wall and an inlet, a plunger movable by said wall, helical coil spring means surrounding said plunger and positioned on one side only of said wall, said spring means cooperating with said wall and being adjustable to oppose expansion or contraction of said wall, means to adjust said spring means, and a pointer operatively connected to said plunger.

PHILIP SHERMAN RUSSEL.
ADOLF VON WANGENHEIM.

13. In a device of the character described,

CERTIFICATE OF CORRECTION.

Patent No. 1,997,917.　　　　　　　　　　　　　　　　　　April 16, 1935.

PHILIP SHERMAN RUSSEL, ET AL.

It is hereby certified that error appears in the printed specification of the above numbered patent requiring correction as follows: Page 2, second column, line 56, for "of" read or; page 3, second column, line 58, claim 11, for "plungers" read plunger; and page 4, first column, line 32, strike out the claim numeral and words "13. In a device of the character described," and insert the same before line 1, of said page and column, as the first line of claim 13; and that the said Letters Patent should be read with these corrections therein that the same may conform to the record of the case in the Patent Office.

Signed and sealed this 16th day of July, A. D. 1935.

Leslie Frazer (Seal)　　　　　　　　　　　　　　　　　　　　　Acting Commissioner of Patents.